(12) United States Patent
Huang et al.

(10) Patent No.: US 11,693,506 B2
(45) Date of Patent: Jul. 4, 2023

(54) METHOD, APPARATUS, AND DEVICE FOR ENABLING TASK MANAGEMENT INTERFACE

(71) Applicant: Huawei Technologies Co., Ltd., Shenzhen (CN)

(72) Inventors: Jiejing Huang, Shenzhen (CN); Huangwei Wu, Shenzhen (CN); Xi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/554,643

(22) Filed: Dec. 17, 2021

(65) Prior Publication Data

US 2022/0121312 A1 Apr. 21, 2022

Related U.S. Application Data

(63) Continuation of application No. 15/562,807, filed as application No. PCT/CN2015/090227 on Sep. 22, 2015, now abandoned.

(30) Foreign Application Priority Data

Apr. 13, 2015 (WO) ................ PCT/CN2015/076466

(51) Int. Cl.
*G06F 17/10* (2006.01)
*G06F 3/041* (2006.01)
(Continued)

(52) U.S. Cl.
CPC .......... *G06F 3/0416* (2013.01); *G06F 3/0482* (2013.01); *G06F 3/0489* (2013.01);
(Continued)

(58) Field of Classification Search
CPC .. G06F 3/0416; G06F 3/04817; G06F 3/0482; G06F 3/0489; G06F 3/0488; G06F 9/4843; G06F 2209/482
See application file for complete search history.

(56) References Cited

U.S. PATENT DOCUMENTS 7,526,458 B2 * 4/2009 Flinn .................. G06Q 30/0185
706/12
8,005,680 B2 8/2011 Kommer
(Continued)

FOREIGN PATENT DOCUMENTS

CN 1517870 A 8/2004
CN 101587440 A 11/2009
(Continued)

OTHER PUBLICATIONS

Chin et al. "Measuring User Confidence in Smartphone Security and Privacy," ACM, 2012, pp. 1-16.
(Continued)

*Primary Examiner* — Shahid K Khan
(74) *Attorney, Agent, or Firm* — Conley Rose, P.C.

(57) ABSTRACT

A method for enabling a task management interface includes receiving an instruction for enabling the task management interface, displaying the task management interface in response to the instruction for enabling the task management interface, where the task management interface includes a preview interface of at least one application program and an icon corresponding to at least one function of the application program, receiving an operation instruction for the icon, and switching the application program corresponding to the icon to a foreground and executing the function in response to the operation instruction.

20 Claims, 6 Drawing Sheets

(51) Int. Cl.
  *G06F 3/0482* (2013.01)
  *G06F 3/04817* (2022.01)
  *G06F 3/0489* (2022.01)
  *G06F 9/48* (2006.01)
  *G06F 3/0488* (2022.01)
(52) U.S. Cl.
  CPC ........ *G06F 3/04817* (2013.01); *G06F 9/4843* (2013.01); *G06F 3/0488* (2013.01); *G06F 2209/482* (2013.01)

(56) References Cited

U.S. PATENT DOCUMENTS

| | | | |
|---|---|---|---|
| 8,402,384 B2* | 3/2013 | Scott | G06F 3/0482 715/779 |
| 8,522,165 B2* | 8/2013 | Cameron | G06F 3/0482 715/802 |
| 9,032,332 B2* | 5/2015 | Chae | H04M 1/7243 715/835 |
| 9,052,820 B2 | 6/2015 | Jarrett et al. | |
| 9,402,161 B2* | 7/2016 | Marti | H04W 4/029 |
| 9,497,312 B1* | 11/2016 | Johansson | H04L 63/0876 |
| 10,747,554 B2* | 8/2020 | Chung | G06F 3/04817 |
| 2004/0141013 A1* | 7/2004 | Alcazar | G06F 9/451 715/847 |
| 2006/0156209 A1* | 7/2006 | Matsuura | H04M 1/72472 714/E11.207 |
| 2007/0067738 A1* | 3/2007 | Flynt | H04M 1/7243 715/810 |
| 2009/0044185 A1* | 2/2009 | Krivopaltsev | H04L 41/0806 717/173 |
| 2009/0222766 A1* | 9/2009 | Chae | G06F 3/0482 715/702 |
| 2009/0307306 A1* | 12/2009 | Jalon | G06F 16/168 715/700 |
| 2010/0169778 A1* | 7/2010 | Mundy | G06F 16/9577 345/619 |
| 2010/0257196 A1* | 10/2010 | Waters | G06F 16/248 707/769 |
| 2010/0261485 A1* | 10/2010 | Fernandes | H04W 4/02 455/456.3 |
| 2010/0299597 A1 | 11/2010 | Shin et al. | |
| 2011/0035675 A1 | 2/2011 | Kim et al. | |
| 2011/0138314 A1* | 6/2011 | Mir | G06F 9/452 715/779 |
| 2011/0157029 A1* | 6/2011 | Tseng | G06F 3/04883 345/173 |
| 2011/0314422 A1* | 12/2011 | Cameron | G06F 3/04842 715/835 |
| 2012/0058783 A1* | 3/2012 | Kim | G06F 1/1694 455/418 |
| 2012/0096249 A1 | 4/2012 | Rubin et al. | |
| 2012/0258696 A1 | 10/2012 | Nam et al. | |
| 2012/0287039 A1 | 11/2012 | Brown et al. | |
| 2013/0014040 A1* | 1/2013 | Jagannathan | H04W 4/50 715/765 |
| 2013/0018915 A1* | 1/2013 | Kalu | G06F 16/9535 707/769 |
| 2013/0031512 A1* | 1/2013 | Liu | G06F 16/9566 715/835 |
| 2013/0111328 A1 | 5/2013 | Khanna et al. | |
| 2013/0139113 A1* | 5/2013 | Choudhary | G06F 3/0238 715/847 |
| 2013/0151148 A1 | 6/2013 | Parundekar et al. | |
| 2013/0173513 A1* | 7/2013 | Chu | G06F 9/451 706/14 |
| 2013/0174179 A1* | 7/2013 | Park | G06F 9/485 718/107 |
| 2013/0181941 A1 | 7/2013 | Okuno et al. | |
| 2013/0239055 A1 | 9/2013 | Ubillos | |
| 2013/0275890 A1 | 10/2013 | Caron et al. | |
| 2013/0345980 A1 | 12/2013 | Van Os et al. | |
| 2014/0012859 A1 | 1/2014 | Heilprin et al. | |
| 2014/0101617 A1* | 4/2014 | Yang | H04M 1/724 715/846 |
| 2014/0104197 A1 | 4/2014 | Khosravy et al. | |
| 2014/0173517 A1* | 6/2014 | Chaudhri | G06F 3/04883 715/830 |
| 2014/0215366 A1* | 7/2014 | Ryu | G06F 8/62 715/765 |
| 2014/0344754 A1 | 11/2014 | Lai et al. | |
| 2014/0372356 A1 | 12/2014 | Bilal et al. | |
| 2015/0012883 A1* | 1/2015 | Kier | G06F 3/0482 715/810 |
| 2015/0178348 A1* | 6/2015 | Rohde | G06F 16/2379 707/734 |
| 2015/0255005 A1 | 9/2015 | Yoda et al. | |
| 2015/0301582 A1 | 10/2015 | Pan | |
| 2016/0062552 A1* | 3/2016 | Jeong | G06F 3/0481 715/788 |
| 2016/0117082 A1 | 4/2016 | Kuscher et al. | |
| 2016/0132344 A1* | 5/2016 | Funk | H04L 65/00 719/328 |
| 2016/0188189 A1* | 6/2016 | Chu | G06F 3/04886 715/779 |
| 2016/0188363 A1* | 6/2016 | Sun | G06F 9/4843 718/107 |
| 2016/0300316 A1 | 10/2016 | Beseda et al. | |
| 2017/0200001 A1 | 7/2017 | Bhullar et al. | |
| 2018/0053325 A1* | 2/2018 | Javice | G06T 11/60 |
| 2018/0203596 A1* | 7/2018 | Dhaliwal | G06F 3/04817 |
| 2018/0335939 A1 | 11/2018 | Karunamuni et al. | |
| 2019/0179503 A1 | 6/2019 | Lu et al. | |

FOREIGN PATENT DOCUMENTS

| | | |
|---|---|---|
| CN | 102035936 A | 4/2011 |
| CN | 102065182 A | 5/2011 |
| CN | 102713819 A | 10/2012 |
| CN | 103309687 A | 9/2013 |
| CN | 103399794 A | 11/2013 |
| CN | 103513969 A | 1/2014 |
| CN | 103543906 A | 1/2014 |
| CN | 104133612 A | 11/2014 |
| CN | 104317852 A | 1/2015 |
| CN | 104571868 A | 4/2015 |

OTHER PUBLICATIONS

Stolee et al., "Revealing the Copy and Paste Habits of End Users," IEEE, 2009, pp. 59-66.

* cited by examiner

METHOD, APPARATUS, AND DEVICE FOR ENABLING TASK MANAGEMENT INTERFACE

CROSS-REFERENCE TO RELATED APPLICATIONS

This is a continuation of U.S. patent application Ser. No. 15/562,807 filed on Sep. 28, 2017, which is a National Stage of International Patent Application No. PCT/CN2015/090227 filed on Sep. 22, 2015, which claims priority to International Patent Application No. PCT/CN2015/076466 filed on Apr. 13, 2015. All of the aforementioned patent applications are hereby incorporated by reference in their entireties.

TECHNICAL FIELD

The present disclosure relates to the field of mobile communications, and in particular, to a method, an apparatus, and a device for enabling a task management interface.

BACKGROUND

A task management interface on an intelligent terminal is used to display an opened window or a running application program. When a user wants to enable a function of the opened window or a running application program, the user needs to perform multiple steps. Especially, when the user wants to enable a specific function of an application program with many levels, operations are complex. For example, in an IOS operating system, a window of an application program "Baidu Map" is opened. When a user wants to enable the function "Frequent Destination" of "Baidu Map" on the task management interface, the user first needs to double-tap a Home key to start the task management interface, then selects "Baidu Map" on the task management interface and switches "Baidu Map" to a foreground, and finally enables the function according to the following path: Map Application→Mine→More Tools→Location Sharing→Initiating a Party→Setting a Destination→Frequent Destination.

It can be learned from the foregoing that, in other approaches, when a user wants to enable a specific function of an opened window or a running application program displayed on a task management interface, operations are complex, which affects user experience.

SUMMARY

Embodiments of the present disclosure provides a method, an apparatus, and a device for enabling a task management interface, which can resolve a problem in the other approaches that when a user wants to enable a function of an opened window or a running application program included in the task management interface, operations are complex and user experience is affected.

According to a first aspect, a method for enabling a task management interface is provided, where the method includes receiving an instruction for enabling the task management interface, displaying the task management interface in response to the instruction for enabling the task management interface, where the task management interface includes a preview interface of at least one application program and an icon corresponding to at least one function of the application program, receiving an operation instruction for the icon, and switching the application program corresponding to the icon to a foreground, and executing the function in response to the operation instruction.

With reference to the first aspect, in a first implementation manner of the first aspect, before displaying the task management interface, the method further includes selecting the at least one application program from a local opened window or a running application program.

With reference to the first aspect or the first implementation manner of the first aspect, in a second implementation manner of the first aspect, before receiving an instruction for enabling the task management interface, the method further includes receiving an entrance parameter that is of at least one function and that is sent, upon an exit of the local application program, by the local application program, and storing the entrance parameter of the at least one function in a storage area corresponding to the local application program.

With reference to the second implementation manner of the first aspect, in a third implementation manner of the first aspect, after the selecting the at least one application program from a local opened window or a running application program, the method further includes sending a broadcast message to the at least one application program, where the broadcast message is used to trigger the at least one application program to return the entrance parameter of the at least one function, and storing the entrance parameter of the at least one function in the storage area corresponding to the at least one application program.

With reference to the second implementation manner of the first aspect or the third implementation manner of the first aspect, in a fourth implementation manner of the first aspect, the icon corresponding to the at least one function of the application program is drawn according to the entrance parameter of the at least one function.

With reference to the first aspect, in a fifth implementation manner of the first aspect, before displaying the task management interface, the method further includes selecting the at least one application program from a local application program with reference to a current user state.

With reference to any one of the first aspect, or the foregoing five implementation manners of the first aspect, in a sixth implementation manner of the first aspect, the function is a commonly used function of a user, and the commonly used function is set according to a setting instruction of the user, and/or the commonly used function is set according to a frequency of using functions of the at least one application program by the user in a preset time period.

With reference to the second implementation manner of the first aspect or the third implementation manner of the first aspect, in a seventh implementation manner of the first aspect, executing the function includes obtaining the entrance parameter of the at least one function corresponding to the icon from the storage area, determining a functional interface of the function according to the entrance parameter of the at least one function corresponding to the icon, and displaying the functional interface on the foreground.

According to a second aspect, an apparatus for enabling a task management interface is provided, where the apparatus includes a receiving unit, a display unit, and a switch unit, where the receiving unit is configured to receive an instruction for enabling the task management interface. The display unit is configured to display the task management interface in response to the instruction for enabling the task management interface received by the receiving unit, where the task management interface includes a preview interface of at least one application program and an icon corresponding to at least one function of the application program. The receiving unit is further configured to receive an operation instruction for the icon, and the switch unit is configured to switch the application program corresponding to the icon to a foreground, and execute the function in response to the operation instruction received by the receiving unit.

With reference to the second aspect, in a first implementation manner of the second aspect, the apparatus further includes a first selection unit configured to select the at least one application program from a local opened window or a running application program.

With reference to the second aspect or the first implementation manner of the second aspect, in a second implementation manner of the second aspect, the apparatus further includes a storage unit. The receiving unit is configured to receive an entrance parameter that is of the at least one function and that is sent, upon an exit of the local application program, by the local application program, and the storage unit is configured to store the entrance parameter of the at least one function received by the receiving unit in a storage area corresponding to the local application program.

With reference to the second implementation manner of the second aspect, in a third implementation manner of the second aspect, the apparatus further includes a sending unit configured to send a broadcast message to the at least one application program, where the broadcast message is used to trigger the at least one application program to return the entrance parameter of the at least one function, and store the entrance parameter of the at least one function in the storage area corresponding to the at least one application program.

With reference to the second implementation manner of the second aspect or the third implementation manner of the second aspect, in a fourth implementation manner of the second aspect, the icon corresponding to the at least one function of the application program is drawn according to the entrance parameter of the at least one function.

With reference to the second aspect, in a fifth implementation manner of the second aspect, the apparatus further includes a second selection unit configured to select the at least one application program from a local application program with reference to a current user state.

With reference to any one of the second aspect, or the foregoing five implementation manners of the second aspect, in a sixth implementation manner of the second aspect, the function is a commonly used function of a user, and the commonly used function is set according to a setting instruction of the user, and/or the commonly used function is set according to a frequency of enabling functions of the at least one application program by the user in a preset time period.

With reference to the second implementation manner of the second aspect, or the third implementation manner of the second aspect, in a seventh implementation manner of the second aspect, the switch unit is further configured to obtain the entrance parameter of the at least one function corresponding to the icon from the storage area, determine a functional interface of the function according to the entrance parameter of the at least one function corresponding to the icon, and display the functional interface on the foreground.

According to a third aspect, a device for enabling a task management interface is provided, where the device includes a processor, a memory, a communications interface, and a bus, where the processor, the memory, and the communications interface communicate using the bus. The communications interface is configured to communicate with a switch or a control server. The memory is configured to store a program, and when the device runs, the processor is configured to execute the program stored in the memory in order to execute the method for enabling a task management interface according to the foregoing first aspect.

According to a fourth aspect, a method for displaying a task management interface is provided, where the method includes receiving an operation of double-tapping a Home key, selecting at least one application program from installed application programs according to a habit of using an application program by a user in response to the operation of double-tapping a Home key, and displaying the task management interface, where the task management interface includes information about the selected at least one application program.

With reference to the fourth aspect, in a first implementation manner of the fourth aspect, the information about the at least one application program comprises an icon corresponding to the at least one application program and/or a preview interface of the at least one application program.

With reference to the fourth aspect or the first implementation manner of the fourth aspect, in a second implementation manner of the fourth aspect, selecting at least one application program from installed application programs according to a habit of using an application program by a user includes selecting the at least one application program from the installed application programs according to use of an application program by the user in daily life.

With reference to the second implementation manner of the fourth aspect, in a third implementation manner of the fourth aspect, selecting the at least one application program from the installed application programs according to use of an application program by the user in daily life includes selecting the at least one application program from the installed application programs according to a frequency of using an application program by the user in different time periods.

With reference to the second implementation manner of the fourth aspect, in a fourth implementation manner of the fourth aspect, selecting the at least one application program from the installed application programs according to use of an application program by the user in daily life includes selecting the at least one application program from the installed application programs according to a frequency of using an application program by the user when human body characteristic parameters of the user are different thresholds.

With reference to the second implementation manner of the fourth aspect, in a fifth implementation manner of the fourth aspect, selecting the at least one application program from the installed application programs according to use of an application program by the user in daily life includes selecting the at least one application program from the installed application programs according to a frequency of using an application program by the user in different locations.

With reference to the fourth aspect, in a sixth implementation manner of the fourth aspect, after displaying the task management interface, the method further includes receiving an operation instruction for the information about the application program, and switching the application program to a foreground, and running the application program in response to the operation instruction.

According to a fifth aspect, a method for operating an application program is provided, and the method includes receiving a first operation instruction, displaying a user interface in response to the first operation instruction, where the user interface comprises an icon of at least one application program and an entrance of at least one commonly used function of the application program, the commonly used function is a function commonly used when the user uses the application program, and the entrance of the commonly used function is used to receive an operation instruction in order to execute the commonly used function of the application program, receiving a second operation instruction for the entrance of the commonly used function, and switching the application program to a foreground, and executing the commonly used function corresponding to the entrance of the commonly used function in response to the second operation instruction.

With reference to the fifth aspect, in a first implementation manner of the fifth aspect, displaying a user interface includes displaying a system user interface.

According to a sixth aspect, a method for running an application program is provided, where the method includes receiving a first operation instruction, displaying a user interface in response to the first operation instruction, wherein the user interface comprises an icon of at least one application program, and the application program is selected from installed application programs according to a habit of using an application program by a user, receiving a second operation instruction for the icon of the application program, and switching the application program to a foreground, and running the application program in response to the second operation instruction.

With reference to the sixth aspect, in a first implementation manner of the sixth aspect, the application program is further selected from the installed application programs according to use of an application program by the user in daily life.

With reference to the sixth aspect, or the first implementation manner of the sixth aspect, in a second implementation manner of the sixth aspect, the application program is further selected from the installed application programs according to a frequency of using an application program by the user in different time periods.

With reference to the sixth aspect, or the first implementation manner of the sixth aspect, in a third implementation manner of the sixth aspect, the application program is further selected from the installed application programs according to a frequency of using an application program by the user when human body characteristic parameters of the user are different thresholds.

With reference to the sixth aspect, or the first implementation manner of the sixth aspect, in a fourth implementation manner of the sixth aspect, the application program is further selected from the installed application programs according to a frequency of using an application program by the user in different locations.

According to a seventh aspect, an apparatus for displaying a task management interface is provided, where the apparatus includes a receiving unit, a selection unit, and a display unit, where the receiving unit is configured to receive an operation of double-tapping a Home key. The selection unit is configured to select at least one application program from installed application programs according to a habit of using an application program by a user in response to the operation of double-tapping a Home key received by the receiving unit, and the display unit is configured to display the task management interface, where the task management interface includes information about the selected at least one application program.

With reference to the seventh aspect, in a first implementation manner of the seventh aspect, the information about the at least one application program comprises an icon corresponding to the at least one application program and/or a preview interface of the at least one application program.

With reference to the seventh aspect, or the first implementation manner of the seventh aspect, in a second implementation manner of the seventh aspect, the selection unit is further configured to select the at least one application program from the installed application programs according to use of an application program by the user in daily life.

With reference to the second implementation manner of the seventh aspect, in a third implementation manner of the seventh aspect, selecting the at least one application program from the installed application programs according to use of an application program by the user in daily life includes selecting the at least one application program from the installed application programs according to a frequency of using an application program by the user in different time periods.

With reference to the second implementation manner of the seventh aspect, in a fourth implementation manner of the seventh aspect, selecting the at least one application program from the installed application programs according to use of an application program by the user in daily life includes selecting the at least one application program from the installed application programs according to a frequency of using an application program by the user when human body characteristic parameters of the user are different thresholds.

With reference to the second implementation manner of the seventh aspect, in a fifth implementation manner of the seventh aspect, selecting the at least one application program from the installed application programs according to use of an application program by the user in daily life includes selecting the at least one application program from the installed application programs according to a frequency of using an application program by the user in different locations.

With reference to the seventh aspect, in a sixth implementation manner of the seventh aspect, the apparatus further includes a running unit. The receiving unit is further configured to receive an operation instruction for the information about the application program, and the running unit is configured to switch the application program to a foreground, and run the application program in response to the operation instruction received by the receiving unit.

According to an eighth aspect, an apparatus for operating an application program is provided, where the apparatus includes a receiving unit, a display unit, and a switch unit The receiving unit is configured to receive a first operation instruction. The display unit is configured to display a user interface in response to the first operation instruction received by the receiving unit, where the user interface comprises an icon of at least one application program and an entrance of at least one commonly used function of the application program, the commonly used function is a function commonly used when a user uses the application program, and the entrance of the commonly used function is used to receive an operation instruction in order to execute the commonly used function of the application program. The receiving unit is further configured to receive a second operation instruction for the entrance of the commonly used function, and the switch unit is configured to switch the application program to a foreground, and execute the commonly used function corresponding to the entrance of the commonly used function in response to the second operation instruction received by the receiving unit.

With reference to the eighth aspect, in a first implementation manner of the eighth aspect, the display unit is further configured to display a system user interface.

According to a ninth aspect, an apparatus for running an application program is provided, where the apparatus includes a receiving unit, a display unit, and a switch unit The receiving unit is configured to receive a first operation instruction. The display unit is configured to display a user interface in response to the first operation instruction received by the receiving unit, wherein the user interface comprises an icon of at least one application program, and the application program is selected from installed application programs according to a habit of using an application program by a user. The receiving unit is further configured to receive a second operation instruction for the icon of the application program, and the switch unit is configured to switch the application program to a foreground, and run the application program in response to the second operation instruction received by the receiving unit.

With reference to the ninth aspect, in a first implementation manner of the ninth aspect, the application program is further selected from the installed application programs according to use of an application program by the user in daily life.

With reference to the ninth aspect, or the first implementation manner of the ninth aspect, in a second implementation manner of the ninth aspect, the application program is further selected from the installed application programs according to a frequency of using an application program by the user in different time periods.

With reference to the ninth aspect, or the first implementation manner of the ninth aspect, in a third implementation manner of the ninth aspect, the application program is further selected from the installed application programs according to a frequency of using an application program by the user when human body characteristic parameters of the user are different thresholds.

With reference to the ninth aspect, or the first implementation manner of the ninth aspect, in a fourth implementation manner of the ninth aspect, the application program is further selected from the installed application programs according to a frequency of using an application program by the user in different locations.

According to a tenth aspect, an apparatus for displaying a task management interface is provided, where the apparatus includes a processor, a memory, a communications interface, and a bus, where the processor, the memory, and the communications interface communicate using the bus. The communications interface is configured to communicate with a switch or a control server. The memory is configured to store a program, and when the apparatus runs, the processor is configured to execute the program stored in the memory in order to execute the method for displaying a task management interface according to the foregoing fourth aspect.

According to an eleventh aspect, an apparatus for operating an application program is provided, where the apparatus includes a processor, a memory, a communications interface, and a bus, where the processor, the memory, and the communications interface communicate using the bus. The communications interface is configured to communicate with a switch or a control server. The memory is configured to store a program, and when the apparatus runs, the processor is configured to execute the program stored in the memory in order to execute the method for operating an application program according to the foregoing fifth aspect.

According to a twelfth aspect, an apparatus for running an application program is provided, where the apparatus includes a processor, a memory, a communications interface, and a bus, where the processor, the memory, and the communications interface communicate using the bus. The communications interface is configured to communicate with a switch or a control server. The memory is configured to store a program, and when the apparatus runs, the processor is configured to execute the program stored in the memory in order to execute the method for running an application program according to the foregoing sixth aspect.

According to the method, apparatus, and device for enabling a task management interface provided in the embodiments of the present disclosure, an instruction for enabling the task management interface is received, the task management interface is displayed in response to the instruction for enabling the task management interface, where the task management interface includes a preview interface of at least one application program and an icon corresponding to at least one function of the application program, an operation instruction for the icon is received, and the application program corresponding to the icon is switched to a foreground, and the function is executed in response to the operation instruction. Therefore, it is convenient for a user to quickly enable a function of an application program included in the task management interface, thereby improving user experience.

DESCRIPTION OF EMBODIMENTS

The technical solutions of the present disclosure are further described in detail with reference to accompanying drawings and embodiments as follows.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

To provide thorough understanding of the present disclosure, the following further describes the embodiments of the present disclosure in detail with reference to the accompanying drawings. The foregoing embodiments are not intended to limit the protection scope of the present disclosure.

Embodiments of the present disclosure provide a method, an apparatus and a device for enabling a task management interface. The task management interface includes a preview interface of at least one application program and an icon corresponding to at least one function of the application program. When an operation instruction for the icon is received, the application program to which the icon belongs may be directly switched to a foreground and the function corresponding to the icon is executed. Therefore, it is convenient for a user to quickly enable a function of an application program included in the task management interface, thereby improving user experience.

Method Embodiment

Figure 1:
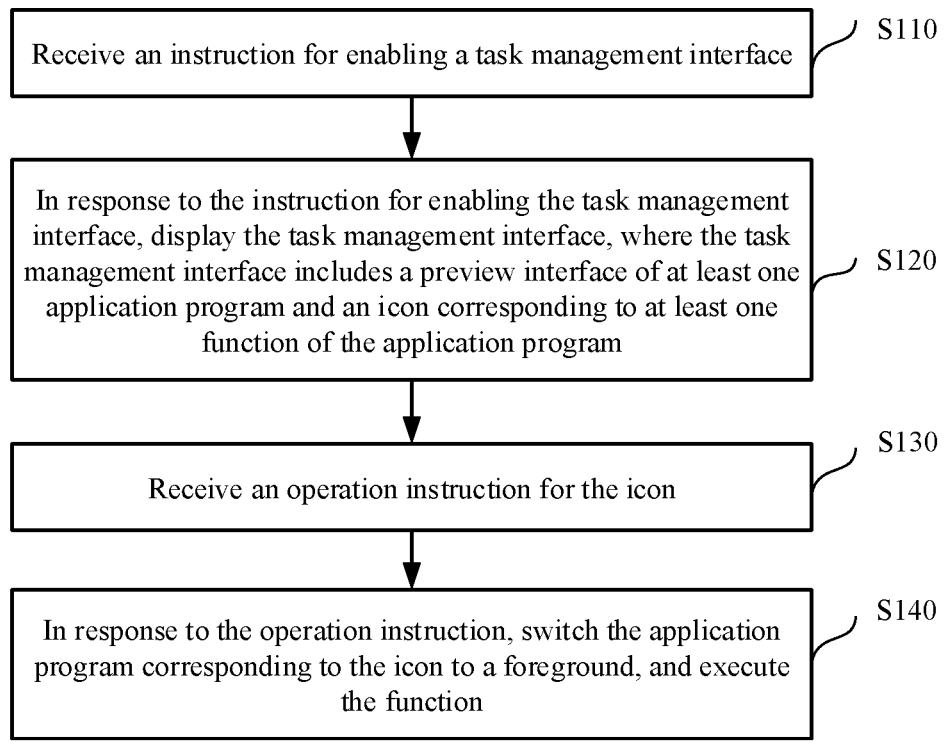
FIG. 1 is a flowchart of a method for enabling a task management interface according to Method Embodiment 1 of the present disclosure.

FIG. 1 is a flowchart of a method for enabling a task management interface according to Method Embodiment 1 of the present disclosure. The method may be executed by an operating system of a terminal device, where the terminal device includes but is not limited to a mobile phone, a mobile computer, a tablet computer, a personal digital assistant (PDA), a media player, a smart television, a smart watch, smart glasses, a smart band, and the like. The operating system of the terminal device may be an IOS operating system, an ANDROID operating system, or another system that can provide a task view function for a user. As shown in FIG. 1, the method includes the following steps.

Step S110: Receive an instruction for enabling the task management interface.

Herein, the task management interface implements the task view function, and the task management interface generally displays an opened window or a running application program. The instruction for enabling the task management interface may be triggered by double-tapping a Home key on the terminal device by a user, or may be triggered in a manner such as tapping and holding a menu key on the terminal device by the user.

Optionally, before step S110 in this embodiment of the present disclosure, the method may further include the steps of receiving an entrance parameter that is of at least one function and that is sent, upon an exit of the local application program, by the local application program, and storing the entrance parameter of the at least one function in a storage area corresponding to the local application program.

The function herein may be a shortcut function (also referred to as a commonly used function) that is of an application program and that is commonly used by the user, or may be another function provided by the application program. In this specification, the foregoing function is a commonly used function of the user. However, it should be noted that the foregoing commonly used function is provided by the application program, but not provided by the task management interface itself. The commonly used function may be set according to a setting instruction of the user, or may be set according to a frequency of using functions of the at least one application program by the user in a preset time period, or may be set using the foregoing two methods, which is not limited in the present disclosure.

For example, if a local application program A provides a setting option of a commonly used function, a user may set the commonly used function of the application program A using the foregoing setting option, for example, the user may preset "Frequented Destination" as a commonly used function of "Baidu Map." In another implementation manner, an application program A may pre-collect a habit of using the application program A by a user, for example, a frequency of enabling, in a preset time period, functions provided by the application program A. In an example in which the application program A is "Baidu Map," if frequencies of enabling, by the user in a preset time period, "Frequent Destination," "Taxi," and "Distance Measurement" provided by "Baidu Map" are respectively 56 times, 12 times, and 42 times, "Frequent Destination" may be set as a commonly used function.

An entrance parameter of the commonly used function may include a name of the commonly used function and an index entry for indexing the commonly used function in the application program. The index entry corresponds to a specific code segment, and when the specific code segment is executed, a functional interface of the commonly used function corresponding to the index entry is loaded. In a specific implementation manner, it is assumed that functions of an application program are obtained by division according to levels, where each function corresponds to a unique flag bit, for example, a flag bit of a first function is "1," a flag bit of a second function is "2," . . . , and so on. Each function may include multiple sub-functions, and each sub-function is also corresponding to a unique flag bit, for example, a flag bit corresponding to a fifth sub-function of the first function is "1-5." In this case, the index entry may be a unique flag bit corresponding to the foregoing function or sub-function.

Herein, a specific application scenario is merely used as an example for describing the index entry, which, however, is not limited in the present disclosure, and a person skilled in the art may set the foregoing index entry to another parameter.

For example, when the user taps a disabling button of "Baidu Application," that is, when the application program exits, entrance parameters of the commonly used function "Frequent Destination" (assuming that "Frequent Destination" corresponds to a fifth sub-function of a sixth function of "Baidu Application") of the application program, namely, "Frequent Destination" and "6-5" are sent to an operating system such that the operating system stores the foregoing received parameters in a storage area corresponding to "Baidu Map."

Step S120: In response to the instruction for enabling the task management interface, display the task management interface, where the task management interface includes a preview interface of at least one application program and an icon corresponding to at least one function of the application program.

Herein, the preview interface of the application program is scaled interface of an application program window, and the preview interface can reflect a change of the application program in real time. For example, after an application program "WECHAT" exits, if a friend sends a message, a "WECHAT" preview interface displays the foregoing message in real time. In addition, the icon may be a text button, a graphical button, or the like, or may be another control drawn by the operating system, and the icon may be set in a hover state, a transparent state, or the like, and a display effect of the icon for an entrance of the commonly used function is not limited in the present disclosure.

Optionally, before displaying the task management interface, the method further includes selecting the at least one application program from a local opened window or a running application program.

The local application program refers to an application program installed by the user on the terminal device. In another implementation manner of the present disclosure, the at least one application program may be selected from a local application program recorded in a browsing history of the user, and in still another implementation manner of the present disclosure, the at least one application program may be selected with reference to the foregoing two implementation manners, which is not limited in the present disclosure.

It may be understood that the local application program recorded in the browsing history of the user may be a running application program or an application program that is not running, and accordingly, the at least one application program selected according to the other implementation manner may be an opened window, a running application program, or an application program that is not running.

In the still another implementation manner of the present disclosure, the at least one application program may be selected from the local application program with reference to a current user state, where the current user state may be a current time of the user, a current geographic location of the user, or a current human body characteristic parameter of the user such as a heart rate, a blood pressure, and an emotion.

Further, the operating system of the terminal device may pre-collect a habit of using the local application program by the user, that is, pre-collect a use frequency of using the local application program by the user in any one or more of the following cases. In a first case, a use frequency of using each application program in the local application program by the user in multiple preset time periods is collected. In a second case, a use frequency of using each application program in the local application program by the user when human body characteristic parameters are multiple thresholds is collected. In a third case, a use frequency of using each application program of the local application program by the user in multiple preset locations is collected.

For example, the use frequencies of using the local application program by the user in the foregoing three cases are pre-collected. In addition, it is assumed that Table 1 lists use frequencies that are collected in the first case and that are of using each application program in the local application program by the user in multiple time periods.

TABLE 1

| Preset Time Period | Application Program A | Application Program B | Application Program C |
| --- | --- | --- | --- |
| 2:00-5:00 | 20 times | 8 times | 12 times |
| 7:00-8:00 | 4 times | 30 times | 11 times |

"2:00-5:00" and "7:00-8:00" are two preset time periods, "20 times," "8 times," and "12 times" respectively indicate use frequencies of using the application program A, the application program B, and the application program C by the user during "2:00-5:00", and "4 times," "30 times," and "11 times" respectively indicate use frequencies of using the application program A, the application program B, and the application program C by the user during "7:00-8:00."

Table 2 lists use frequencies that are collected in the second case and that are of using each application program in the local application program by the user when the human body characteristic parameters are multiple thresholds.

TABLE 2

| Preset Human Body Characteristic parameter | Application Program A | Application Program B | Application Program C |
| --- | --- | --- | --- |
| Threshold A | 3 times | 23 times | 10 times |
| Threshold B | 22 times | 42 times | 50 times |

When the preset human body characteristic parameter is the threshold A, it indicates that the user is undergoing a movement, and when the preset human body characteristic parameter is the threshold B, it indicates that the user is in still, "3 times," "23 times," and "10 times" respectively indicate use frequencies of using the application program A, the application program B, and the application program C by the user in a movement, and "22 times," "42 times," and "50 times" respectively indicate use frequencies of using the application program A, the application program B, and the application program C by the user in still.

Table 3 lists use frequencies that are collected in the third case and that are of using each application program in the local application program by the user in multiple preset locations.

TABLE 3

| Preset Location | Application Program A | Application Program B | Application Program C |
| --- | --- | --- | --- |
| Location 1 | 22 times | 32 times | 76 times |
| Location 2 | 42 times | 12 times | 56 times |

The location 1 and the location 2 are any location that has unique longitude and latitude values, "22 times," "32 times," and "76 times" respectively indicate use frequencies of using the application program A, the application program B, and the application program C by the user at the location 1, and "42 times," "12 times," and "56 times" respectively indicate use frequencies of using the application program A, the application program B, and the application program C by the user at the location 2.

For the foregoing pre-collected habit of using the local application program by the user, before the management interface is displayed, one or more types of information among a current time of the user, a current geographic location of the user, or a human body characteristic parameter of the user are first obtained. In an example in which only one type of the information (for example, the current time of the user) is obtained, the current time is compared with multiple preset time periods, and if the current time is within a preset time period, a most frequently used application program among all application programs used in the preset time period is selected as the at least one application program. For example, it is assumed that the obtained current time point is 7:30, and the time point is within an interval of the second time period (7:00-8:00) listed in Table 2. The use frequencies of using the application program A, the application program B, and the application program C in the second time period are respectively "4 times," "30 times," and "11 times," that is, the use frequency of the application program B is the highest. Therefore, the application program B is selected as the at least one application program.

The foregoing provides a description using the example in which only one type of the information is obtained, and one application program is selected from the local application program with reference to the information. When multiple types of the information is obtained, a person skilled in the art can select the at least one application program from the local application program according to the method of the present disclosure, and displays the at least one application program on the task management interface, which is not limited in the present disclosure.

After the at least one application program is selected, if the storage area corresponding to the at least one application program does not store the entrance parameter of the at least one commonly used function of the application program, a broadcast message may be sent to the application program, where the broadcast information is used to trigger the at least one application program to return the entrance parameter of the at least one commonly used function, and the entrance parameter of the at least one function is stored in the storage area corresponding to the at least one application program.

For example, if the application program selected in the foregoing procedure is "Baidu Application," the stored entrance parameters "Frequent Destination" and "6-5" of the at least one commonly used function are obtained from the storage area corresponding to "Baidu Application." Herein, if multiple application programs are selected, a pre-stored entrance parameter of at least one commonly used function are separately obtained from storage areas corresponding to the multiple application programs. For an application program having multiple commonly used functions, entrance parameters of the multiple commonly used functions are obtained from a storage area corresponding to the application program.

In the foregoing example, if the storage area corresponding to the selected at least one application program does not store the entrance parameter of the at least one commonly used function of the application program, after the at least one application program is selected, for example, after one application program "Baidu Application" is selected, a broadcast message may be sent to "Baidu Application." After receiving the foregoing broadcast message, "Baidu Application" returns entrance parameters "Frequent Destination" and "6-5" of a commonly used function of "Baidu Application" to the operating system, and the operating system stores the foregoing received entrance parameters in the storage area corresponding to "Baidu Application." Herein, if multiple application programs are selected, a broadcast message is sent to the multiple application programs, and when any application program in the multiple application programs has more than one commonly used function, entrance parameters of the more than one commonly used function are returned to the operating system, and the operating system stores the entrance parameters of the more than one commonly used function in the storage area corresponding to "Baidu Application."

After the entrance parameter of the at least one commonly used function of the foregoing application program is obtained from the storage area, an icon corresponding to the at least one commonly used function may be drawn according to the entrance parameter of the at least one commonly used function.

Figure 2:
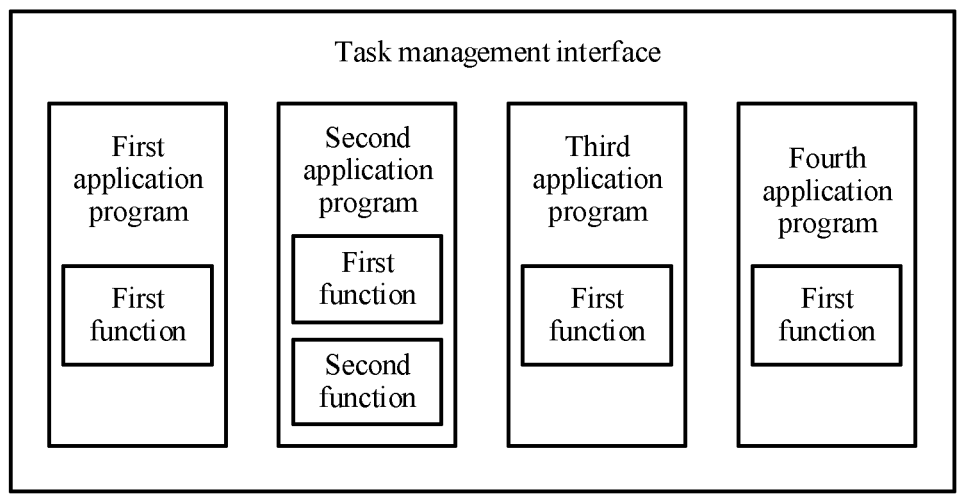
FIG. 2 is a schematic diagram of a task management interface according to the present disclosure.

Referring to a schematic diagram of a task management interface provided in the present disclosure shown in FIG. 2, the task management interface includes preview interfaces of four application programs: preview interfaces of a first application program, a second application program, a third application program, and a fourth application program, and further includes buttons corresponding to two shortcut functions (designated as first function and second function) that are commonly used by a user and of the second application program, and a button corresponding to a shortcut function (designated as first function) that is commonly used by the user and of another application program.

It is noted herein that the foregoing embodiment provides only one icon display position and display manner, and a person skilled in the art may also display the icon in another position of the task management interface and may display the icon in another manner, provided that the user can clearly see and can easily distinguish the application program corresponding to the commonly used function.

In FIG. 2, if the first application program is "Baidu Application," and "Baidu Application" has one function "Frequent Destination" commonly used by the user, that an icon corresponding to the commonly used function is drawn according to the entrance parameter of the commonly used function includes displaying a name of the commonly used function "Frequent Destination" in a button of the first application program, and establishing a correspondence between the button of the first application program and the index entry "6-5." After the correspondence between the button of the first application program and the index entry "6-5" is established, when the user taps the foregoing button, the task management interface is switched to a functional interface of "Frequent Destination."

Step S130: Receive an operation instruction for the icon.

Herein, the operation instruction may be but is not limited to tap operation triggering of the user on a touch interface of the terminal device.

Step S140: In response to the operation instruction, switch the application program corresponding to the icon to a foreground, and execute the function.

The execution of the function in step S140 includes obtaining the entrance parameter of the at least one function corresponding to the icon from the storage area, determining a functional interface of the function according to the entrance parameter of the at least one function corresponding to the icon, and displaying the functional interface on the foreground.

It should be noted that switching the application program corresponding to the icon to a foreground after responding to the operation instruction, includes that the operating system disables the task management interface, and enables the application program corresponding to the icon (for example, when receiving a tap of a user on an icon of a commonly used function of "Baidu Map" on the task management interface, the operating system disables the task management interface, and enables "Baidu Map"). Because the commonly used function is executed the foregoing step, and executing the commonly used function refers to enabling the functional interface of the commonly used function, after step S140 ends, the terminal device displays the functional interface of the commonly used function (in the foregoing example, the terminal device displays the functional interface of the commonly used function "Frequent Destination").

In FIG. 2, when the user taps the button of the first application program, the system first obtains "6-5" corresponding to the button from the storage area corresponding to "Baidu Application," searches for a code segment corresponding to the index entry according to "6-5" corresponding to the button, and runs the foregoing code segment such that the functional interface of "Frequent Destination" may be determined, that is, after the commonly used function is executed, the task management interface may be switched to the functional interface of "Frequent Destination," and the currently running application program is "Baidu Application."

Certainly, in practical application, after the operation instruction is responded to, the application program corresponding to the icon may be not switched to the foreground, and the commonly used function is directly executed on a background, that is, the system still stays in the task management interface, and executes the commonly used function on the background without a need of enabling the functional interface of the commonly used function, and after completing the execution of the commonly used function, the system may display prompt information to the user, where the prompt information may indicate that the commonly used function is successfully executed (for example, popping up a dialog box for prompting), or the system may directly execute the commonly used function without a need of prompting the user.

Optionally, the method further includes the following step.

Switching the application program corresponding to the preview interface to a foreground for display when an operation instruction of the preview interface is received.

In FIG. 2, when the user taps the first application program, the task management interface is switched to a preview interface of "Baidu Application."

According to the method for enabling a task management interface provided in Embodiment 1 of the present disclosure, an instruction for enabling the task management interface is received, the task management interface is displayed in response to the instruction for enabling the task management interface, where the task management interface includes a preview interface of at least one application program and an icon corresponding to at least one function of the application program, an operation instruction for the icon is received, the application program corresponding to the icon is switched to a foreground in response to the operation instruction, and the function is executed. Therefore, it is convenient for a user to quickly enable a function of an application program included in the task management interface, thereby improving user experience.

Figure 3:
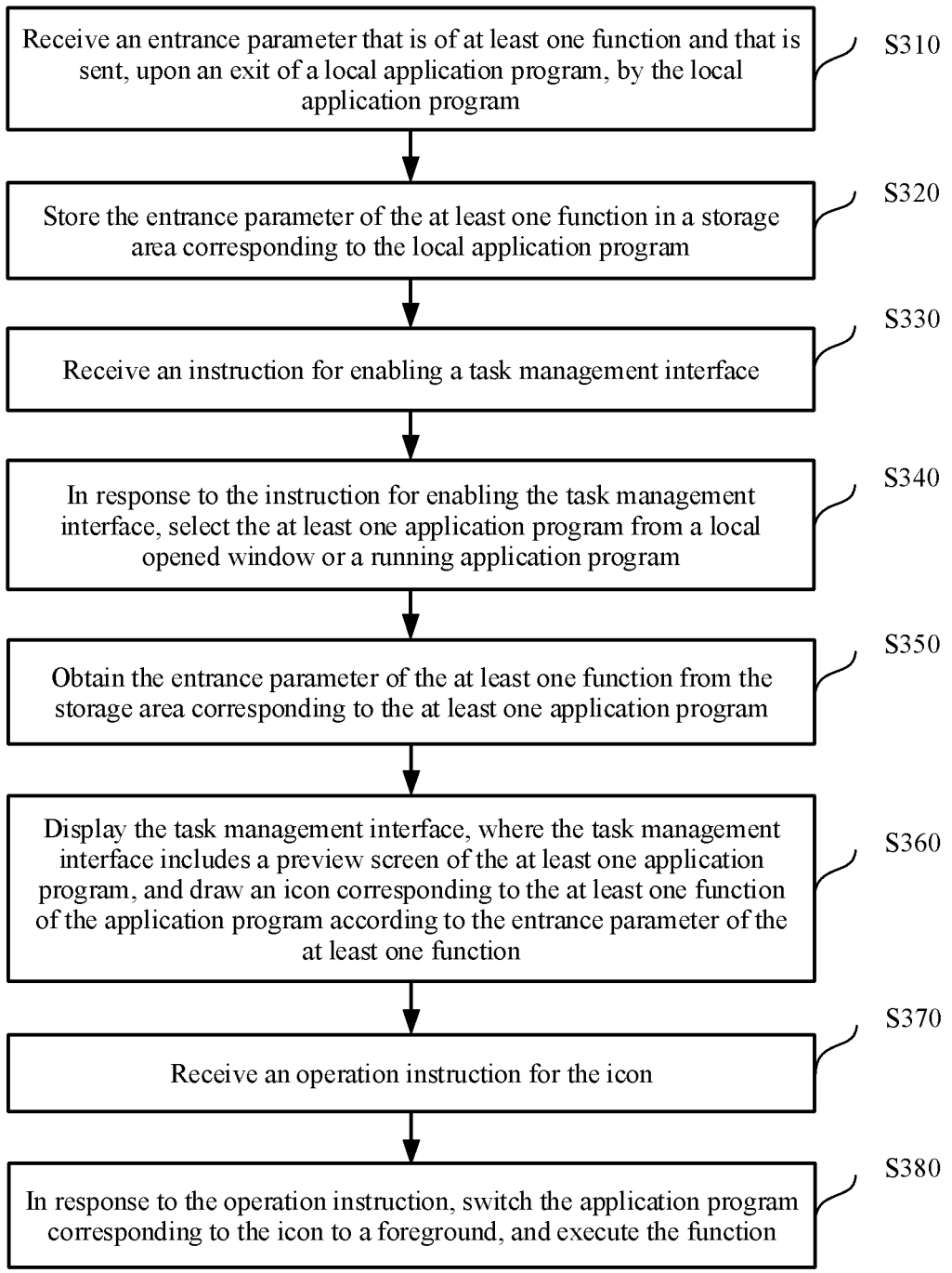
FIG. 3 is a flowchart of a method for enabling a task management interface according to Method Embodiment 2 of the present disclosure.

FIG. 3 is a flowchart of a method for enabling a task management interface according to Method Embodiment 2 of the present disclosure, and the method may be executed by an operating system of a terminal device. As shown in FIG. 3, the method includes the following steps.

Step S310: Receive an entrance parameter that is of at least one function and that is sent, upon an exit of a local application program, by the local application program.

Step S320: Store the entrance parameter of the at least one function in a storage area corresponding to the local application program.

The function herein may be a shortcut function (also referred to as a commonly used function) that is of an application program and that is commonly used by the user, or may be another function provided by the application program. In this specification, the foregoing function is a commonly used function of the user. However, it should be noted that the foregoing commonly used function is provided by the application program, but not provided by the task management interface itself. The commonly used function may be set according to a setting instruction of the user, may be set according to a frequency of using functions of the at least one application program by the user in a preset time period, or may be set using the foregoing two methods, which is not limited in the present disclosure.

For example, if a local application program A provides a setting option of a commonly used function, a user may set the commonly used function of the application program A using the foregoing setting option, for example, the user may preset "Frequented Destination" as a commonly used function of "Baidu Map." In another implementation manner, an application program A may pre-collect a habit of using the application program A by a user, for example, a frequency of enabling, in a preset time period, functions provided by the application program A. In an example in which the application program A is "Baidu Map," if frequencies of enabling, by the user in a preset time period, "Frequent Destination," "Taxi," and "Distance Measurement" provided by "Baidu Map" are respectively 56 times, 12 times, and 42 times, "Frequent Destination" may be set as a commonly used function.

An entrance parameter of the commonly used function may include a name of the commonly used function and an index entry for indexing the commonly used function in the application program. The index entry corresponds to a specific code segment, and when the specific code segment is executed, a functional interface of the commonly used function corresponding to the index entry is loaded. In a specific implementation manner, it is assumed that functions of an application program are obtained by division according to levels, where each function corresponds to a unique flag bit, for example, a flag bit of a first function is "1," a flag bit of a second function is "2," . . . , and so on. Each function may include multiple sub-functions, and each sub-function is also corresponding to a unique flag bit, for example, a flag bit corresponding to a fifth sub-function of the first function is "1-5." In this case, the index entry may be a unique flag bit corresponding to the foregoing function or sub-function.

Herein, a specific application scenario is merely used as an example for describing the index entry, which, however, is not limited in the present disclosure, and a person skilled in the art may set the foregoing index entry to another parameter.

For example, when the user taps a disabling button of "Baidu Application," that is, when the application program exits, entrance parameters of the commonly used function "Frequent Destination" (assuming that "Frequent Destination" corresponds to a fifth sub-function of a sixth function of "Baidu Application") of the application program, namely, "Frequent Destination" and "6-5" are sent to an operating system such that the operating system stores the foregoing received parameters in a storage area corresponding to "Baidu Application."

Step S330: Receive an instruction for enabling the task management interface.

Herein, the task management interface implements the task view function, and the task management interface generally displays an opened window or a running application program. The instruction for enabling the task management interface may be triggered by double-tapping a Home key on the terminal device by a user, or may be triggered in a manner such as tapping a menu key on the terminal device by the user.

Step S340: In response to the instruction for enabling the task management interface, select the at least one application program from a local opened window or a running application program.

The local application program refers to an application program installed by the user on the terminal device. In another implementation manner of the present disclosure, the at least one application program may be selected from a local application program recorded in a browsing history of the user, and in still another implementation manner of the present disclosure, the at least one application program may be selected with reference to the foregoing two implementation manners, which is not limited in the present disclosure.

It may be understood that the local application program recorded in the browsing history of the user may be a running application program or an application program that is not running, and accordingly, the at least one application program selected according to the other implementation manner may be an opened window, a running application program, or an application program that is not running.

Step S350: Obtain the entrance parameter of the at least one function from the storage area corresponding to the at least one application program.

In the foregoing example, if the application program selected in the foregoing procedure is "Baidu Application," the stored entrance parameters "Frequent Destination" and "6-5" of the at least one commonly used function are obtained from the storage area corresponding to "Baidu Application." Herein, if multiple application programs are selected, a pre-stored entrance parameter of at least one commonly used function are separately obtained from storage areas corresponding to the multiple application programs. For an application program having multiple commonly used functions, entrance parameters of the multiple commonly used functions are obtained from a storage area corresponding to the application program.

Step S360: Display the task management interface, where the task management interface includes a preview interface of the at least one application program, and draw an icon corresponding to the at least one function of the application program according to the entrance parameter of the at least one function.

Herein, the preview interface of the application program is scaled interface of an application program window, and the preview interface can reflect a change of the application program in real time. For example, after an application program "WECHAT" exits, if a friend sends a message, a "WECHAT" preview interface displays the foregoing message in real time. In addition, the icon may be a text button, a graphical button, or the like, or may be another control drawn by the operating system, and the icon may be set in a hover state, a transparent state, or the like, and a display effect of the icon for an entrance of the commonly used function is not limited in the present disclosure.

Referring to a schematic diagram of a task management interface provided in the present disclosure shown FIG. 2, the task management interface includes preview interfaces of four application programs: preview interfaces of a first application program, a second application program, a third application program, and a fourth application program, and further includes buttons corresponding to two shortcut functions that are commonly used by a user and of the second application program, and a button corresponding to a shortcut function that is commonly used by the user and of another application program.

If the first application program is "Baidu Application," and "Baidu Application" has one function "Frequent Destination" commonly used by the user, that an icon corresponding to the commonly used function is drawn according to the entrance parameter of the commonly used function, which includes displaying a name of the commonly used function "Frequent Destination" in a button of the first application program, and establishing a correspondence between the button of the first application program and the index entry "6-5." After the correspondence between the button of the first application program and the index entry "6-5" is established, when the user taps the foregoing button, the task management interface is switched to a functional interface of "Frequent Destination."

Step S370: Receive an operation instruction for the icon.

Herein, the operation instruction may be but is not limited to tap operation triggering of the user on a touch interface of the terminal device.

Step S380: In response to the operation instruction, switch the application program corresponding to the icon to a foreground, and execute the function.

It should be noted that switching the application program corresponding to the icon to a foreground after responding to the operation instruction, includes that the operating system disables the task management interface, and enables the application program corresponding to the icon (for example, when receiving a tap of a user on an icon of a commonly used function of the application program "Baidu Map," the operating system disables the task management interface, and enables the application program "Baidu Map"). Because the commonly used function is executed the foregoing step, and the executing the commonly used function refers to enabling the functional interface of the commonly used function, after step S380 ends, the terminal device displays the functional interface of the commonly used function (in the foregoing example, the terminal device displays the functional interface of the commonly used function "Frequent Destination").

In FIG. 2, when the user taps the button of the first application program, the system first obtains "6-5" corresponding to the button from the storage area corresponding to "Baidu Application," searches for a code segment corresponding to the index entry according to "6-5" corresponding to the button, and runs the foregoing code segment such that the functional interface of "Frequent Destination" may be determined, that is, after the commonly used function is executed, the task management interface may be switched to the functional interface of "Frequent Destination," and the currently running application program is "Baidu Application".

Certainly, in practical application, after the operation instruction is responded to, the application program corresponding to the icon may be not switched to the foreground, and the commonly used function is directly executed on a background, that is, the system still stays in the task management interface, and executes the commonly used function on the background without a need of enabling the functional interface of the commonly used function, and the system may display prompt information to the user after completing the execution of the commonly used function, where the prompt information may indicate that the commonly used function is successfully executed (for example, popping up a dialog box for prompting), or the system may directly execute the commonly used function without a need of prompting the user.

According to the method for enabling a task management interface provided by Embodiment 2 of the present disclosure, it is convenient for a user to quickly enable a function of an application program included in the task management interface, thereby improving user experience.

Figure 4:
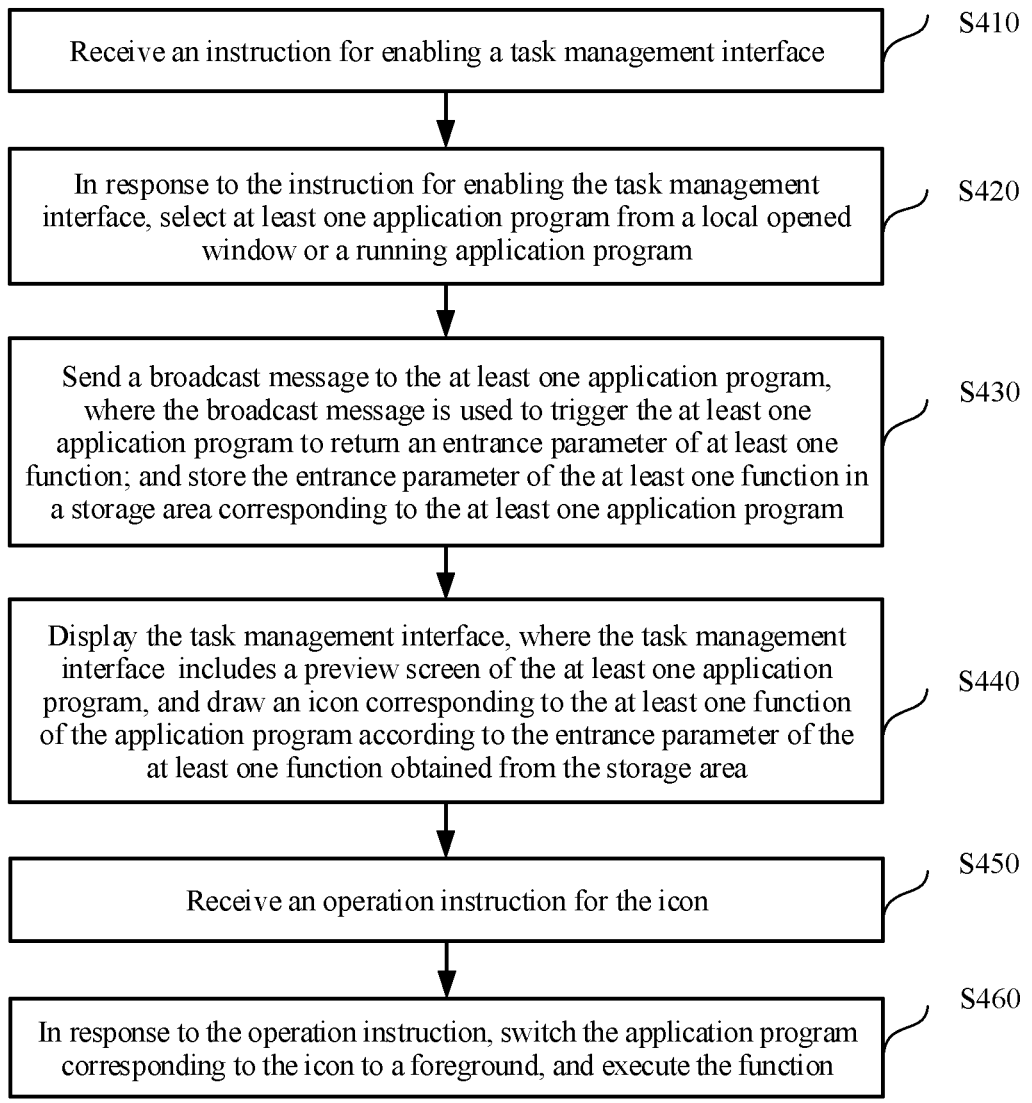
FIG. 4 is a flowchart of a method for enabling a task management interface according to Method Embodiment 3 of the present disclosure.

FIG. 4 is a flowchart of a method for enabling a task management interface according to Method Embodiment 3 of the present disclosure, and the method may be executed by an operating system of a terminal device. As shown in FIG. 4, the method includes the following steps.

Step S410: Receive an instruction for enabling the task management interface.

Herein, the task management interface implements the task view function, and the task management interface generally displays an opened window or a running application program. The instruction for enabling the task management interface may be triggered by double-tapping a Home key on the terminal device by a user, or may be triggered in a manner such as tapping and holding a menu key on the terminal device by the user.

Step S420: In response to the instruction for enabling the task management interface, select at least one application program from a local opened window or a running application program.

The local application program refers to an application program installed by the user on the terminal device. In another implementation manner of the present disclosure, the at least one application program may be selected from a local application program recorded in a browsing history of the user, and in still another implementation manner of the present disclosure, the at least one application program may be selected with reference to the foregoing two implementation manners, which is not limited in the present disclosure.

It may be understood that the local application program recorded in the browsing history of the user may be a running application program or an application program that is not running, and accordingly, the at least one application program selected according to the other implementation manner may be an opened window, a running application program, or an application program that is not running.

Step S430: Send a broadcast message to the at least one application program, where the broadcast message is used to trigger the at least one application program to return an entrance parameter of at least one function, and store the entrance parameter of the at least one function in a storage area corresponding to the at least one application program.

The function herein may be a shortcut function (also referred to as a commonly used function) that is of an application program and that is commonly used by the user, or may be another function provided by the application program. In this specification, the foregoing function is a commonly used function of the user. However, it should be noted that the foregoing commonly used function is provided by the application program, but not provided by the task management interface itself. The commonly used function may be set according to a setting instruction of the user, may be set according to a frequency of using functions of the at least one application program by the user in a preset time period, or may be set using the foregoing two methods, which is not limited in the present disclosure.

For example, if a local application program A provides a setting option of a commonly used function, a user may set the commonly used function of the application program A using the foregoing setting option, for example, the user may preset "Frequented Destination" as a commonly used function of "Baidu Map." In another implementation manner, an application program A may pre-collect a habit of using the application program A by a user, for example, a frequency of enabling, in a preset time period, functions provided by the application program A. In an example in which the application program A is "Baidu Map," if frequencies of enabling, by the user in a preset time period, "Frequent Destination," "Taxi," and "Distance Measurement" provided by "Baidu Map" are respectively 56 times, 12 times, and 42 times, "Frequent Destination" may be set as a commonly used function.

An entrance parameter of the commonly used function may include a name of the commonly used function and an index entry for indexing the commonly used function in the application program. The index entry corresponds to a specific code segment, and when the specific code segment is executed, a functional interface of the commonly used function corresponding to the index entry is loaded. In a specific implementation manner, it is assumed that functions of an application program are obtained by division according to levels, where each function corresponds to a unique flag bit, for example, a flag bit of a first function is "1," a flag bit of a second function is "2," . . . , and so on. Each function may include multiple sub-functions, and each sub-function is also corresponding to a unique flag bit, for example, a flag bit corresponding to a fifth sub-function of the first function is "1-5." In this case, the index entry may be a unique flag bit corresponding to the foregoing function or sub-function.

Herein, a specific application scenario is merely used as an example for describing the index entry, which, however, is not limited in the present disclosure, and a person skilled in the art may set the foregoing index entry to another parameter.

For example, after one application program "Baidu Application" is selected, a broadcast message may be sent to "Baidu Application." After receiving the foregoing broadcast message, "Baidu Application" returns entrance parameters "Frequent Destination" and "6-5" of a commonly used function of "Baidu Application" to the operating system, and the operating system stores the foregoing received entrance parameters in the storage area corresponding to "Baidu Application." Herein, if multiple application programs are selected, a broadcast message is sent to the multiple application programs, and when any application program in the multiple application programs has more than one commonly used function, entrance parameters of the more than one commonly used function are returned to the operating system, and the operating system stores the entrance parameters of the more than one commonly used function in the storage area corresponding to "Baidu Application."

After the entrance parameter of the at least one commonly used function of the foregoing application program is obtained from the storage area, an icon corresponding to the at least one commonly used function may be drawn according to the entrance parameter of the at least one commonly used function.

Steps S440 to S460 are the same as steps S360 to S380, and details are not repeatedly described herein.

According to the method for enabling a task management interface provided by Embodiment 3 of the present disclosure, it is convenient for a user to quickly enable a function of an application program included in the task management interface, thereby improving user experience.

Figure 5:
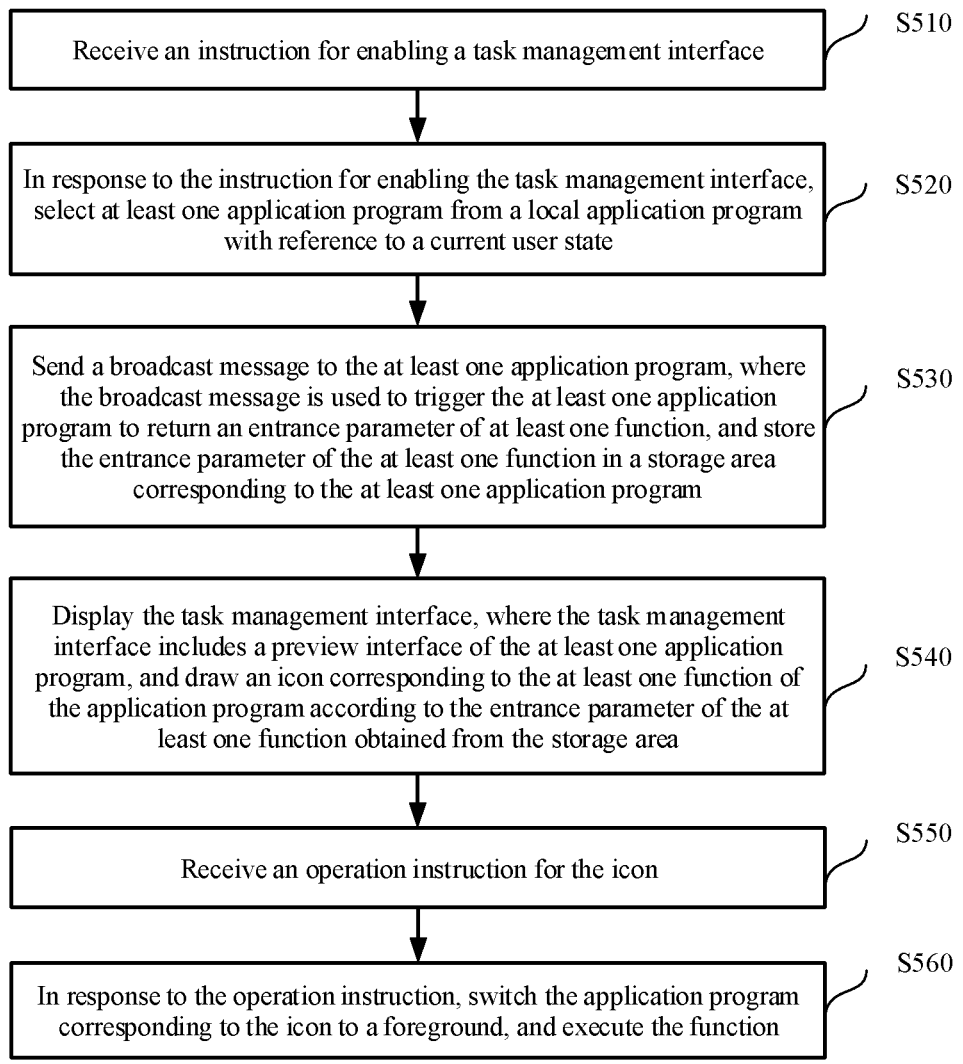
FIG. 5 is a flowchart of a method for enabling a task management interface according to Method Embodiment 4 of the present disclosure.

FIG. 5 is a flowchart of a method for enabling a task management interface according to Method Embodiment 4 of the present disclosure, and the method may be executed by an operating system of a terminal device. As shown in FIG. 5, the method includes the following steps.

Step S510: Receive an instruction for enabling the task management interface.

Herein, the task management interface implements the task view function, and the task management interface generally displays an opened window or a running application program. The instruction for enabling the task management interface may be triggered by double-tapping a Home key on the terminal device by a user, or may be triggered in a manner such as tapping and holding a menu key on the terminal device by the user.

Step S520: In response to the instruction for enabling the task management interface, select at least one application program from a local application program with reference to a current user state.

The current user state may be a current time of the user, a current geographic location of the user, or a current human body characteristic parameter of the user such as a heart rate, a blood pressure, and an emotion.

The operating system of the terminal device may pre-collect a habit of using the local application program by the user, that is, pre-collect a use frequency of using the local application program by the user in any one or more of the following cases. In a first case, a use frequency of using each application program in the local application program by the user in multiple preset time periods is collected. In a second case, a use frequency of using each application program in the local application program by the user when human body characteristic parameters are multiple thresholds is collected. In a third case, a use frequency of using each application program of the local application program by the user in multiple preset locations is collected.

For the foregoing pre-collected habit of using the local application program by the user, before the management interface is displayed, one or more types of information among a current time of the user, a current geographic location of the user, or a human body characteristic parameter of the user are first obtained. In an example in which only one type of the information (for example, the current time of the user) is obtained, the current time is compared with multiple preset time periods, and if the current time is within a preset time period, a most frequently used application program among all application programs used in the preset time period is selected as the at least one application program. For example, it is assumed that the obtained current time point is 7:30, and the time point is within an interval of the second time period (7:00-8:00) listed in Table 2. The use frequencies of using the application program A, the application program B, and the application program C in the second time period are respectively "4 times," "30 times," and "11 times," that is, the use frequency of the application program B is the highest. Therefore, the application program B is selected as the at least one application program.

The foregoing provides a description using the example in which only one type of the information is obtained, and one application program is selected from the local application program with reference to the information. When multiple types of the information is obtained, a person skilled in the art can select the at least one application program from the local application program according to the method of the present disclosure, and displays the at least one application program on the task management interface, which is not limited in the present disclosure.

Steps S530 to S560 are the same as S430 to S460, and details are not repeatedly described herein.

According to the method for enabling a task management interface provided by Embodiment 4 of the present disclosure, it is convenient for a user to quickly enable a function of an application program included in the task management interface, thereby improving user experience.

In another embodiment of the present disclosure, the operating system of the terminal device may pre-collect a habit of using the local application program by the user, further, pre-collect a use frequency of using the local application program by the user in any one or more of the following cases. In a first case, a use frequency of using each application program in the local application program by the user in multiple preset time periods is collected. In a second case, a use frequency of using each application program in the local application program by the user when human body characteristic parameters are multiple thresholds is collected. In a third case, a use frequency of using each application program of the local application program by the user in multiple preset locations is collected.

For the foregoing pre-collected habit of using the local application program by the user, before the management interface is displayed, one or more types of information among a current time of the user, a current geographic location of the user, or a human body characteristic parameter of the user are first obtained. In an example in which only one type of the information (for example, the current time of the user) is obtained, the current time is compared with multiple preset time periods, and a most frequently used application program in all application programs used in a time period including the current time is selected as the at least one application program. A preview interface of the selected at least one application program is displayed on the task management interface.

When an operation instruction of the preview interface is received, switching the application program corresponding to the preview interface to a foreground for display.

The foregoing provides a description using the example in which only one type of the information is obtained, and one application program is selected from the local application program with reference to the information. When multiple types of the information is obtained, a person skilled in the art can select the at least one application program from the local application program according to the method of the present disclosure, and displays the at least one application program on the task management interface, which is not limited in the present disclosure.

It should be noted that the selected at least one application program herein may be a running application program of the local application program, or may be an application program that is not running. When the selected at least one application program is a running application program, the operating system of the terminal device may further send a request message to the application program, where the request message is used to trigger the foregoing selected at least one application program to return information collected when the foregoing selected at least one application program runs on a background such that the operating system of the terminal device displays the collected information on the task management interface. For example, when the selected application program is an opened window or a running application program "Health," the foregoing collected information may include information such as a running time of a user, a quantity of steps, distance, or a heart rate of a user.

Figure 6:
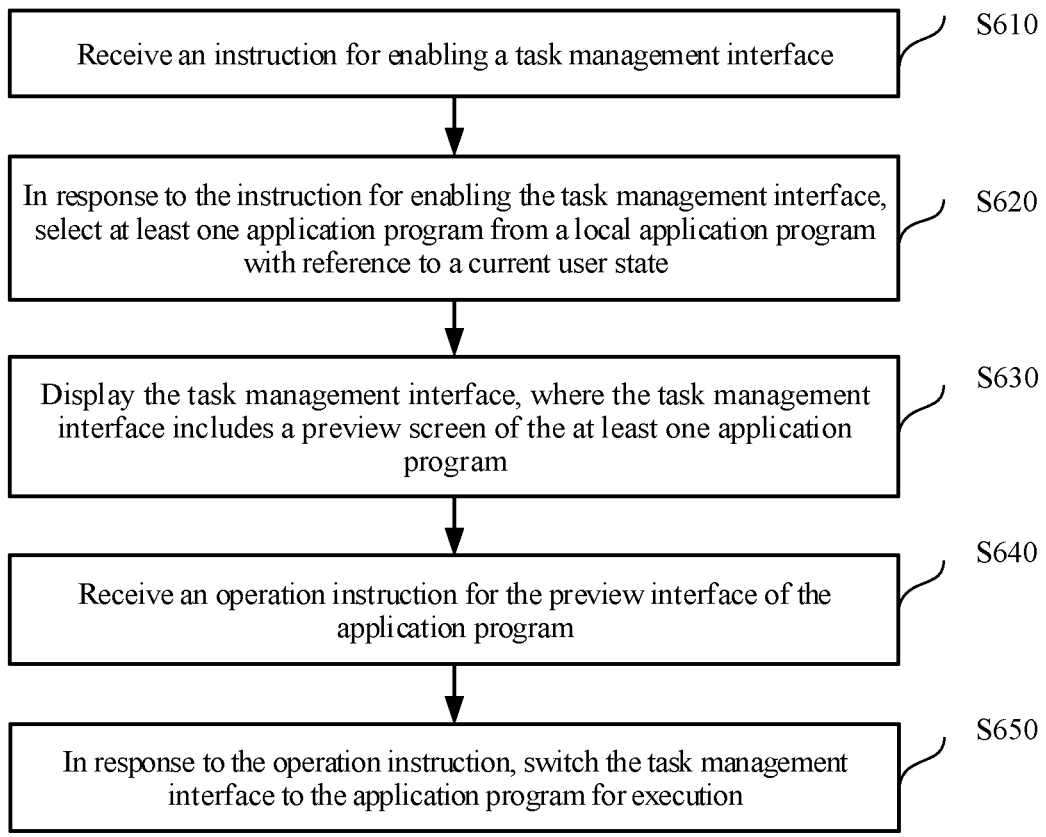
FIG. 6 is a flowchart of a method for enabling a task management interface according to Method Embodiment 5 of the present disclosure.

FIG. 6 is a flowchart of a method for enabling a task management interface according to Method Embodiment 5 of the present disclosure, and the method may be executed by an operating system of a terminal device. As shown in FIG. 6, the method includes the following steps.

Steps S610 to S620 are the same as steps S510 to S520, and details are not repeatedly described herein.

Step S630: Display the task management interface, where the task management interface includes a preview interface of the at least one application program.

In a specific implementation manner, the foregoing preview interface may be a scaled interface of a functional interface window of a commonly used function that is used by a user and of the application program. For example, when the application program is "Baidu Application," the foregoing preview interface may be a scaled interface of a functional interface window of a commonly used function "Frequent Destination" that is used by the user and of "Baidu Application."

It should be noted that the application program included on the foregoing task management interface may be an opened window, a running application program, or an application program that is not running.

Step S640: Receive an operation instruction for the preview interface of the application program.

Herein, the operation instruction may be but is not limited to tap operation triggering of the user on a touch interface of the terminal device.

Step S650: In response to the operation instruction, switch the task management interface to the application program for execution.

It should be noted that switching the task management interface to the application program after responding to the operation instruction, includes that the operating system disables the task management interface, and enables the application program (for example, when receiving a tap of a user on a preview interface of "Baidu Map," the operating system disables the task management interface, and enables the application program "Baidu Map"). Because the foregoing preview interface is a scaled interface of a functional interface window that is used by the user and of the application program, after step S650 ends, the terminal device displays a functional interface of a commonly used function (in the foregoing example, the terminal device displays a functional interface of the commonly used function "Frequent Destination").

Certainly, in practical application, after the operation instruction is responded to, the application program corresponding to the icon may be not switched to the foreground, and the commonly used function is directly executed on a background, that is, the system still stays in the task management interface, and executes the commonly used function on the background without a need of enabling the functional interface of the commonly used function, and after completing the execution of the commonly used function, the system may display prompt information to the user, where the prompt information may indicate that the commonly used function is successfully executed (for example, popping up a dialog box for prompting), or the system may directly execute the commonly used function without a need of prompting the user.

According to the method for enabling a task management interface provided in Embodiment 5 of the present disclosure, it is convenient for a user to quickly switch from the task management interface to a functional interface commonly used by the user, the functional interface herein is provided by an application program, and the application program is selected from a local application program with reference to a current user state, thereby improving user experience.

Apparatus Embodiment

Figure 7:
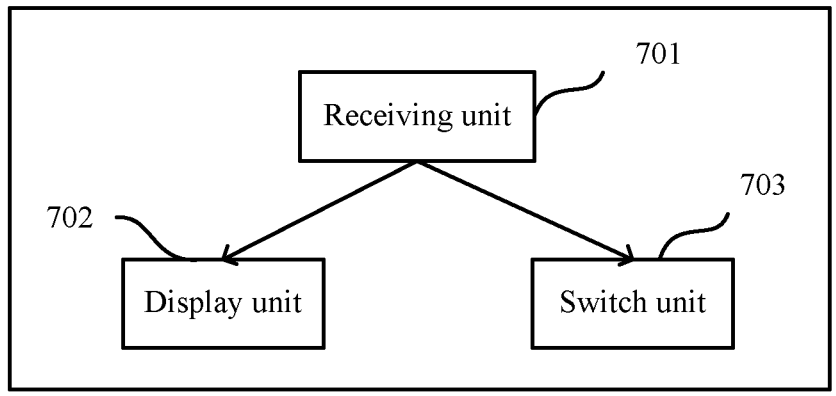
FIG. 7 is a schematic diagram of an apparatus for enabling a task management interface according to an apparatus embodiment of the present disclosure.

FIG. 7 is a schematic diagram of an apparatus for enabling a task management interface according to an apparatus embodiment of the present disclosure. As shown in FIG. 7, the apparatus includes a receiving unit 701, a display unit 702, and a switch unit 703.

The receiving unit 701 is configured to receive an instruction for enabling the task management interface.

The display unit 702 is configured to display the task management interface in response to the instruction for enabling the task management interface received by the receiving unit 701, where the task management interface includes a preview interface of at least one application program and an icon corresponding to at least one function of the application program.

The receiving unit 701 is further configured to receive an operation instruction for the icon.

The switch unit 703 is configured to switch the application program corresponding to the icon to a foreground, and execute the function in response to the operation instruction received by the receiving unit 701.

The function is a commonly used function of a user, where the commonly used function is set according to a setting instruction of the user, and\or the commonly used function is set according to a frequency of using functions of the at least one application program by the user in a preset time period.

The switch unit 703 is further configured to obtain the entrance parameter of the at least one function corresponding to the icon from a storage area, determine a functional interface of the function according to the entrance parameter of the at least one function corresponding to the icon, and display the functional interface on the foreground.

Optionally, the apparatus further includes a first selection unit (not shown) configured to select the at least one application program from a local opened window or a running application program.

Optionally, the apparatus further includes a storage unit (not shown). The receiving unit 701 is further configured to receive an entrance parameter that is of the at least one function and that is sent, upon an exit of the local application program, by the local application program, and the storage unit is configured to store the entrance parameter of the at least one function received by the receiving unit 701 in a storage area corresponding to the local application program.

Optionally, the apparatus further includes a sending unit (not shown) configured to send a broadcast message to the at least one application program, where the broadcast message is used to trigger the at least one application program to return the entrance parameter of the at least one function, and store the entrance parameter of the at least one function in the storage area corresponding to the at least one application program.

The icon corresponding to the at least one function of the application program is drawn according to the entrance parameter of the at least one function.

Optionally, the apparatus further includes a second selection unit (not shown) configured to select the at least one application program from a local application program with reference to a current user state.

The apparatus provided in Embodiment 5 of the application executes the method provided in Embodiment 1 of the application. Therefore, a specific working process of the apparatus provided in the application is not repeatedly described herein.

According to the apparatus for enabling a task management interface provided in Embodiment 5 of the present disclosure, the receiving unit 701 receives an instruction for enabling the task management interface. The display unit 702 responds to the instruction for enabling the task management interface and displays the task management interface, where the task management interface includes a preview interface of at least one application program and an icon corresponding to at least one function of the application program. The receiving unit 701 receives an operation instruction for the icon, and the switch unit 703 responds to the operation instruction, switches the application program corresponding to the icon to a foreground, and executes the function. Therefore, it is convenient for a user to quickly enable a function of an application program included in the task management interface, thereby improving user experience.

Device Embodiment

Figure 8:
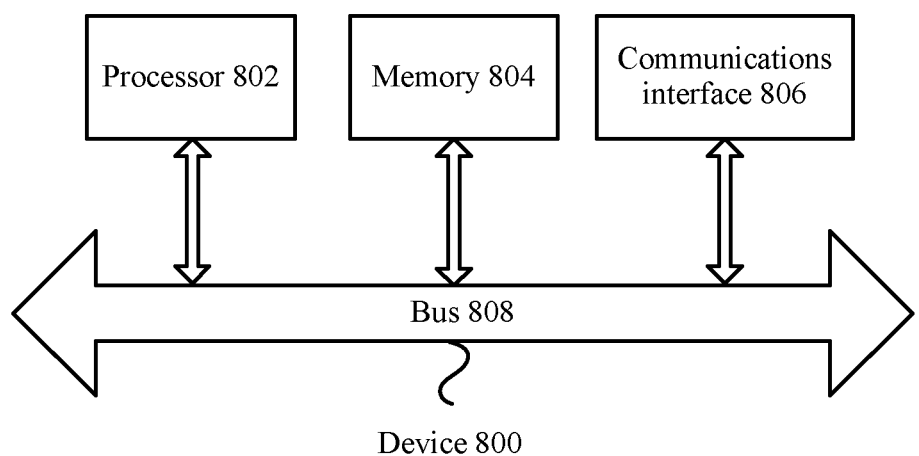
FIG. 8 is a schematic diagram of a device for enabling a task management interface according to a device embodiment of the present disclosure.

FIG. 8 is a schematic diagram of a device 800 for enabling a task management interface according to a device embodiment of the present disclosure. As shown in FIG. 8, the device 800 includes a processor 802, a memory 804, a communications interface 806, and a bus 808. The processor 802, the memory 804, and the communications interface 806 implement mutual communication connections using the bus 808.

The processor 802 may use a general-purpose central processing unit (CPU), a microprocessor, an application specific integrated circuit (ASIC), or one or more integrated circuits, and is configured to execute a related program in order to implement technical solutions provided in the foregoing method embodiments of the present disclosure.

The processor 802 may further include a parsing module, an invoking module, a collection module, and the like. The parsing module parses an operation instruction inputted by a user, the invoking module is configured to invoke an application program in an operating system, and the collection module is configured to collect preference or a habitual operation of the user during a process of using a local application program by the user.

The memory 804 may be a read-only memory (ROM), a static storage device, a dynamic storage device, or a random access memory (RAM). The memory 804 may store an operating system and another application program. When the technical solution provided in this embodiment of the present disclosure is implemented using software or firmware, program code used to implement any optional technical solution provided in the foregoing method embodiment of the present disclosure is stored in the memory 804, and is executed by the processor 802.

The communications interface 806 is configured to communicate with another switch or control server.

The bus 808 may include a channel through which information is transmitted between parts (such as the processor 802, the memory 804, and the communications interface 806) of the device 800.

Using the device 800 for enabling a task management interface provided by the device embodiment of the present disclosure, it is convenient for a user to quickly enable a function of an application program included in the task management interface, thereby improving user experience.

It should be noted that embodiments of the present disclosure provides a description using the task management interface as an example, which, however, is not limited, and the embodiments of the present disclosure is be further applicable to another user interface in addition to the task management interface, such as a lock interface, a standby interface, a notification center interface, and a control center interface that are different from the task management interface only in a triggering manner, for example, the lock interface may be triggered by pressing down a power button on a terminal device, the notification center interface may be triggered by performing an up-to-down sliding operation on a touch interface of the terminal device by the user, and the control center interface may be triggered by performing a down-to-up sliding operation on the touch interface of the terminal device by the user.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a RAM, a memory, a ROM, an electrically programmable ROM (EPROM), an electrically erasable programmable ROM (EEPROM), a register, a hard disk, a removable disk, a compact disc ROM (CD-ROM), or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

The invention claimed is:

1. A method for displaying a task management interface, wherein the method comprises:
   receiving an instruction for enabling the task management interface;
   selecting, in response to the instruction, a first application program with reference to a current user state, wherein the current user state comprises a current time, a current geographic location, a first indication of whether the first application program is running or not running, or a second indication of whether the first application program is a local application program;
   sending a broadcast message to the first application program, wherein the broadcast message is used to trigger the first application program to return an entrance parameter of at least one function;
   storing the entrance parameter of the at least one function in a storage area corresponding to the first application program:
   displaying the task management interface, wherein the task management interface comprises a preview interface of the first application program, and wherein the preview interface corresponds to a first function of the first application program according to the entrance parameter, wherein the first function is one of the at least one function, and wherein the entrance parameter comprises a commonly used function indicator;
   receiving an operation to the preview interface;
   switching, in response to the operation, the task management interface to the first application program; and
   displaying the first function.

2. The method of claim 1, further comprising drawing a text button corresponding to the first function on the preview interface.

3. The method of claim 1, wherein before displaying the task management interface, the method further comprises obtaining the current time or the current geographic location.

4. The method of claim 1, wherein before displaying the task management interface, the method further comprises collecting a use frequency of a user using each application program in the local application program in multiple preset time periods or in multiple preset locations.

5. The method of claim 1, further comprising:
selecting a most frequently used application program among all application programs used in one preset time period as the first application program when the current time is within the one preset time period; or
selecting a most frequently used application program among all application programs used in one preset location as the first application program when the current geographic location is within the one preset location.

6. The method of claim 1, wherein the preview interface is a scaled interface of the first application program, and wherein the preview interface reflects a change of the first application program in real time.

7. An electronic device, comprising:
a memory configured to store computer-executable instructions; and
a processor coupled to the memory and configured to execute the instructions to cause the electronic device to:
receive an instruction for enabling a task management interface;
select, in response to the instruction, a first application program with reference to a current user state; wherein the current user state comprises a current time, a current geographic location, a first indication of whether the first application program is running or not running, or a second indication of whether the first application program is a local application program;
send a broadcast message to the first application program, wherein the broadcast message is used to trigger the first application program to return an entrance parameter of at least one function;
store the entrance parameter of the at least one function in a storage area corresponding to the first application program;
display the task management interface, wherein the task management interface comprises a preview interface of the first application program, and wherein the preview interface corresponds to a first function of the first application program according to the entrance parameter, wherein the first function is one of the at least one function, and wherein the entrance parameter comprises a commonly used function indicator;
receive an operation to the preview interface;
switch, in response to the operation, the task management interface to the first application program; and
display the first function.

8. The electronic device of claim 7, wherein the processor is further configured to execute the instructions to cause the electronic device to draw a text button corresponding to the first function on the preview interface.

9. The electronic device of claim 7, wherein the processor is further configured to execute the instructions to cause the electronic device to obtain the current time or the current geographic location.

10. The electronic device of claim 7, wherein the processor is further configured to execute the instructions to cause the electronic device to collect a use frequency of a user using each application program in the local application program in multiple preset time periods or in multiple preset locations.

11. The electronic device of claim 7, wherein the processor is further configured to execute the instructions to cause the electronic device to:
select a most frequently used application program among all application programs used in one preset time period as the first application program when the current time is within the one preset time period; or
select a most frequently used application program among all application programs used in one preset location as the first application program when the current geographic location is within the one preset location.

12. The electronic device of claim 7, wherein the preview interface of the first application program is a scaled interface of the first application program, and wherein the preview interface reflects a change of the first application program in real time.

13. A computer program product comprising computer-executable instructions stored on a non-transitory computer-readable medium that, when executed by a processor, cause an electronic device to:
receive an instruction for enabling a task management interface;
select, in response to the instruction, a first application program with reference to a current user state; wherein the current user state comprises a current time, a current geographic location, a first indication of whether the first application program is running or not running, or a second indication of whether the first application program is a local application program;
send a broadcast message to the first application program, wherein the broadcast message is used to trigger the first application program to return an entrance parameter of at least one function;
store the entrance parameter of the at least one function in a storage area corresponding to the first application program:
display the task management interface, wherein the task management interface comprises a preview interface of the first application program, and wherein the preview interface corresponds to a first function of the first application program according to the entrance parameter, wherein the first function is one of the at least one function, and wherein the entrance parameter comprises a commonly used function indicator;
receive an operation to the preview interface;
switch, in response to the operation, the task management interface to the first application program; and
display the first function.

14. The computer program product of claim 13, wherein the instructions further cause the electronic device to draw a text button corresponding to the first function on the preview interface.

15. The computer program product of claim 13, wherein the instructions further cause the electronic device to obtain the current time or the current geographic location.

16. The computer program product of claim 13, wherein the instructions further cause the electronic device to collect a use frequency of a user using each application program in the local application program in multiple preset time periods or in multiple preset locations.

17. The computer program product of claim 13, wherein the instructions further cause the electronic device to:
   select a most frequently used application program among all application programs used in one preset time period as the first application program when the current time is within the one preset time period; or
   select a most frequently used application program among all application programs used in one preset location as the first application program when the current geographic location is within the one preset location.

18. The computer program product of claim 13, wherein the preview interface is a scaled interface of the first application program, and wherein the preview interface reflects a change of the first application program in real time.

19. The computer program product of claim 13, wherein the instructions further cause the electronic device to obtain the current time.

20. The computer program product of claim 13, wherein the instructions further cause the electronic device to obtain the current geographic location.

* * * * *